United States Patent [19]

Forss et al.

[11] 4,105,606

[45] Aug. 8, 1978

[54] ADHESIVE FOR THE MANUFACTURE OF PLYWOOD, PARTICLE BOARDS, FIBER BOARDS AND SIMILAR PRODUCTS

[75] Inventors: Kaj G. Forss; Agneta G. M. Fuhrmann, both of Helsinki, Finland

[73] Assignee: Keskuslaboratorio-Central-laboratorium Ab, Finland

[21] Appl. No.: 815,673

[22] Filed: Jul. 14, 1977

Related U.S. Application Data

[63] Continuation-in-part of Ser. No. 604,114, Aug. 13, 1975, abandoned, which is a continuation-in-part of Ser. No. 395,901, Sep. 10, 1973, abandoned.

[30] Foreign Application Priority Data

Sep. 14, 1972 [FI] Finland .................................. 2527/72
Jan. 28, 1975 [FI] Finland .................................. 752289
Jan. 28, 1975 [FI] Finland .................................. 751/74

[51] Int. Cl.$^2$ ..................... C08L 97/00; C08L 61/14
[52] U.S. Cl. ................................. 260/17.5; 156/335; 260/17.2
[58] Field of Search ................................. 260/17.5

[56] References Cited

U.S. PATENT DOCUMENTS

| 2,159,411 | 5/1939 | Wallace | 260/57 |
| 2,168,160 | 8/1939 | Hochwalt et al. | 260/53 |
| 2,794,790 | 6/1957 | Marshall et al. | 260/17.5 |
| 2,891,918 | 6/1959 | Uschmann | 260/17.5 |
| 3,095,392 | 6/1963 | Herrick | 260/17.5 |
| 3,185,654 | 5/1965 | Ball et al. | 260/17.5 |
| 3,658,638 | 4/1972 | Ludwig et al. | 161/262 |
| 3,677,884 | 7/1972 | Bornstein | 161/262 |

Primary Examiner—Harold D. Anderson
Assistant Examiner—E. A. Nielsen
Attorney, Agent, or Firm—Andrus, Sceales, Starke & Sawall

[57] ABSTRACT

An adhesive for the manufacture of plywood, fiber board, particle board, and similar products, and containing the combination of phenol formaldehyde resin, and a lignin derivative, such as lignosulfonates, or alkali lignins. According to the invention a minimum of 65% by weight of the lignosulfonates and a minimum of 40% by weight of the alkali lignins have relative molecular weights in excess of that of Glucagon.

19 Claims, 8 Drawing Figures

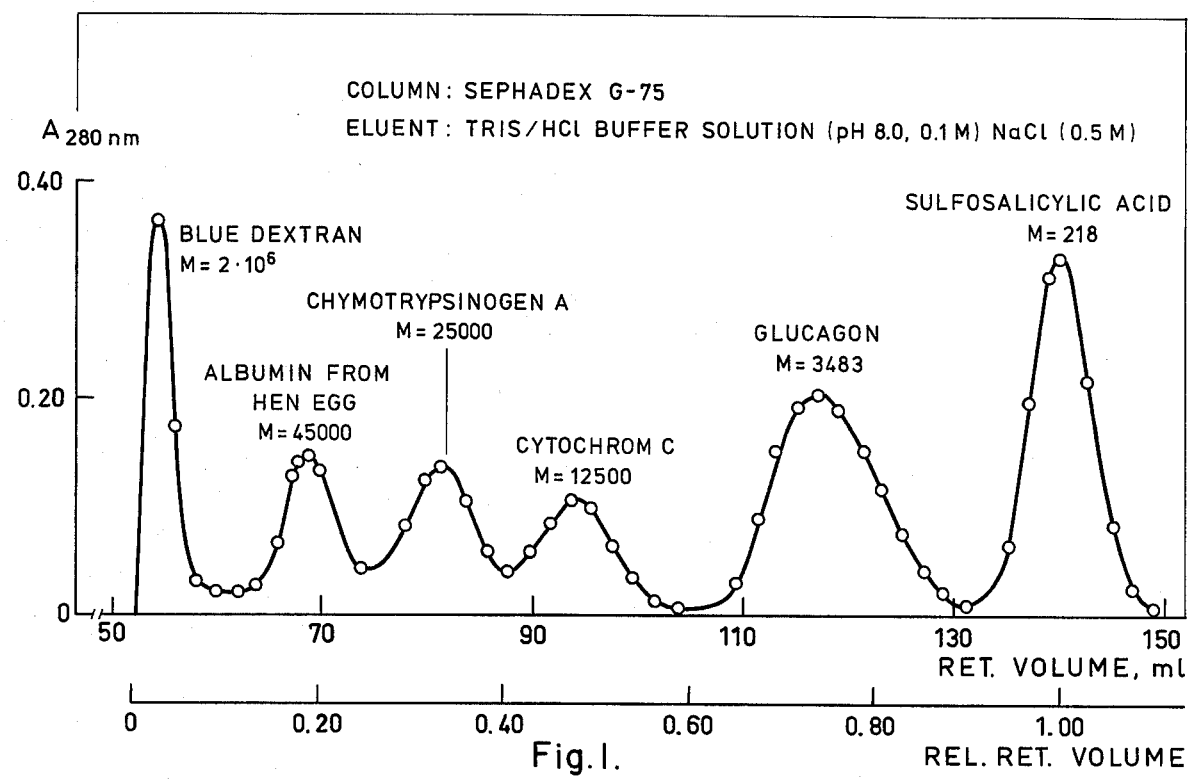
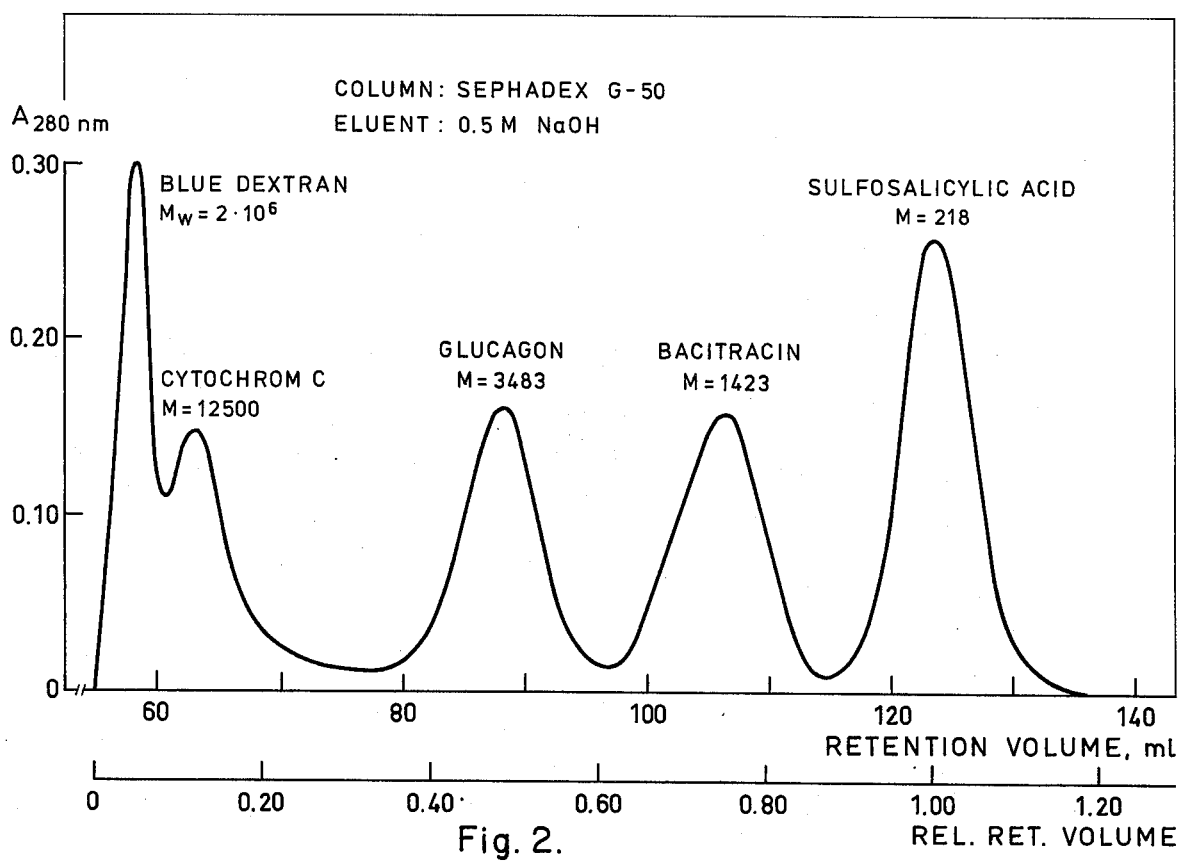

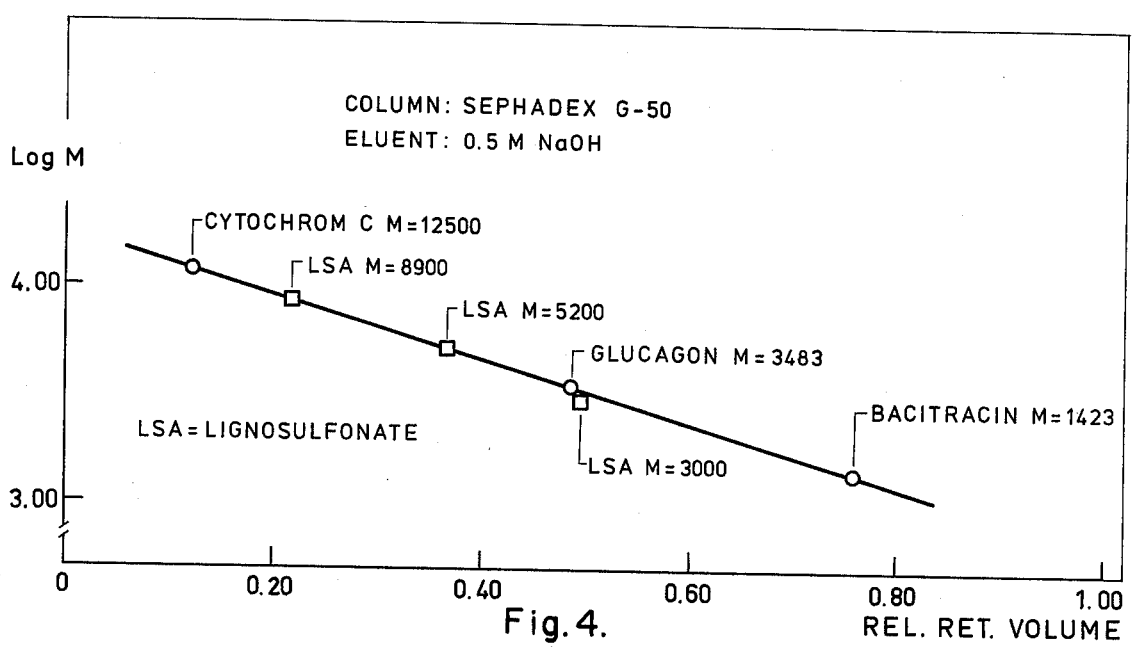
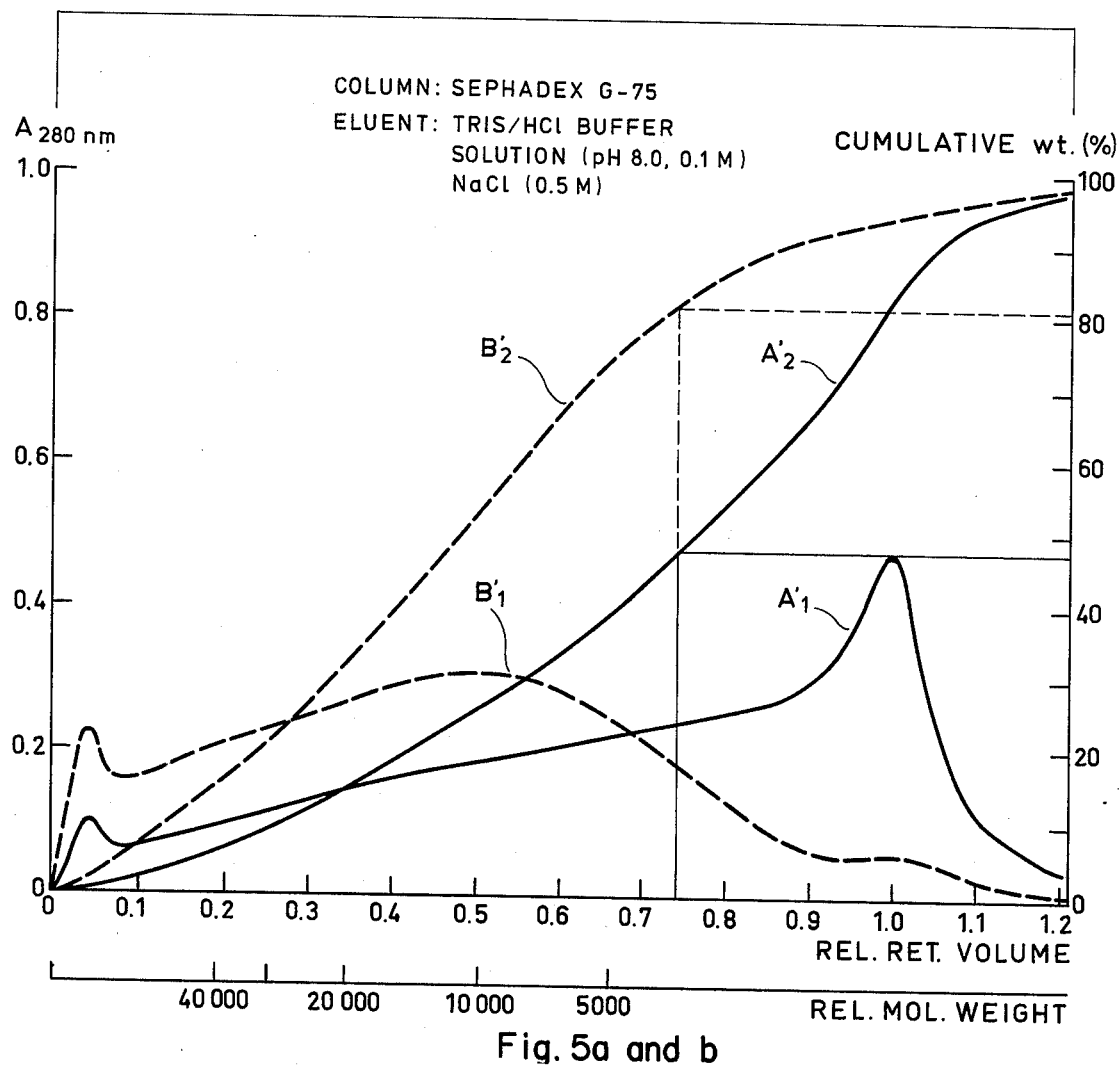
Fig. 5a and b

ADHESIVE FOR THE MANUFACTURE OF PLYWOOD, PARTICLE BOARDS, FIBER BOARDS AND SIMILAR PRODUCTS

BACKGROUND OF THE INVENTION

This application is a continuation-in-part of application Ser. No. 604,114, filed Aug. 13, 1975, now abandoned which is a continuation-in-part of application Ser. No. 395,901, filed Sept. 10, 1973 now abandoned.

In a sulfite process in which pulp is manufactured by heating wood chips under pressure with bisulfite and sulfur dioxide solutions, about half of the wood dissolves forming the so-called spent sulfite liquor. Amongst the organic main components of the spent liquor are lignosulfonic acids, which have different applications.

In the past, spent sulfite liquor has been used as an adhesive as such, but because it is soluble in water, the utilization is rather limited, and it cannot for instance be used for the gluing of plywood and particle boards. To improve the adhesive properties, different measures have been proposed; for example in Danish Pat. No. 100,984 concerning the manufacture of weatherproof particle boards by using spent sulfite liquor, the liquor pH is lowered with acid, whereupon the liquor thus processed is sprayed onto chips which are compressed into boards. The heating is achieved in two phases, the latter prefereably in an autoclave. The manufacturing process is for this reason inconvenient and complicated on an industrial scale, and owing to the acidity of the adhesive, the equipment is subject to corrosion. Another process of the same type has been developed by K. C. Shen and described in Adhesives Age 19 (1976), 33 - 35, according to which sulfuric acid is added to spent sulfite liquor to lower the pH below 1, thereby obviously increasing the rate of self-condensation.

In Finnish Patent application No. 965/69 attemps have been made to get rid of the two-phase heating by using preprocessed, chlorinated spent sulfite liquor. The same endeavour is expressed in the article "Ueber die Herstellung von Holzpanplatten auf Basis von Sulfitablauge II. Ueber ein neues und schnelles Verfahren zur Herstellung Sulfitablauge gebundener Spanplatten", Holzforschung 25 (1971), 149–55. According to this process, two-phase heating can be avoided by mixing phenol formaldehyde resin with the spent sulfite liquor. It has been found by research that the optimum pH of the adhesive is 4–5 because by using alkaline solution the boards' thickness swelling is increased.

In U.S. Pat. No. 2,786,008, acid ammonium-based spent sulfite liquor mixed with acid tolerant phenol-formaldehyde resin has been proposed as an adhesive for fiber boards and plywood boards.

Lignosulfonates separated from a solution of spent sulfite liquor in mixture with phenol formaldehyde resin have been proposed as an adhesive for particle and fiber boards, for example in Canadian Pat. No. 735,389. A similar adhesive for plywood boards for indoor purposes is mentioned in the article "Thermosetting Adhesives From Electrodialyzed Lignosulfonates", Tappi 50 (1967), 92-4A. Owing to the limited water resistance of such adhesives there have been attempts to modify the lignosulfonates in order to improve these properties. For example, in U.S. Pat. No. 3,658,638, the lignosulfonates are pre-reacted with phenol under alkaline conditions and subsequently the lignosulfonate-phenol is reacted with formaldehyde under alkaline conditions.

In the alkaline pulping processes wood chips are heated under pressure with a water solution of sodium hydroxide. The most widely used alkaline pulping process is the sulfate or kraft process in which the pulping liquor additionally contains sulfide and hydrosulfide ions. The spent alkaline liquor from the kraft process, often called black liquor, contains the wood lignin in the form of derivatives soluble in alkaline solutions. These lignin derivatives from alkaline processes are in the following designated as alkali lignins. It has been discovered, as Schulerud, C. F. and Doughty, J. B., point out in their article "Reactive Lignin-Derived Products in Phenolic High-Pressure Laminates", Tappi 44 (1961), 823–30, that lignins from the sulfate process react poorly with phenol formaldehyde resins. Therefore, there have been efforts to produce a lignin product with better reactivity, e.g. by chemically modifying black liquor or lignins obtained therefrom. For example, in the Finnish Patent application, Ser. No. 1965/72, black liquor is condensed with formaldehyde and the resulting product is thereafter mixed with phenol formaldehyde resin. U.S. Pat. No. 3,185,654 discloses a method in which acidified lignin obtained from the black liquor of the sulfate process is dissolved in phenol formaldehyde resin using e.g. methanol, ethanol, or propanol as co-solvent maintaining the pH of the resulting adhesive solution between 3 and 7. In this patent various alkali lignin fractions obtained by precipitation with acid were studied, but no significant difference in performance in these fractions was found. The inventors concluded that all alkali lignin fractions are useable as long as the alkali lignin is in the free acid form. The reason for this behaviour is in all probability due to self-condensation of lignins. As Sven A. Rydholm in his book "Pulping Processes", p. 201, Interscience Publishers, 1965, points out, lignin self-condensation takes place during mild acidic conditions. This reaction has also been considered for making thermosetting plastics with or without the aid of extra addition of phenols or formaldehyde.

Although the acidic adhesives are reactive and often not expensive, they suffer from a considerable drawback due to the fact that the glycosidic bonds of cellulose and other carbohydrates in wood, paper etc., are easily hydrolyzable in acidic condition, causing decrease in the strength properties of the final product. For this reason it would be better to use alkaline adhesives, but in alkaline solutions lignosulfonates or alkali lignins are not inclined to self-condensation to the same extent as in acidic solution.

To overcome the poor reactivity of alkali lignins there have been efforts to produce adhesives based on chemically modified alkali lignins. For example in U.S. Pat. No. 3,864,291, black liquor from the kraft pulping process is reacted with formaldehyde, whereupon the reaction product is mixed with phenol-formaldehyde resin.

The above mentioned drawbacks connected with lignosulfonate and alkali lignin bases adhesives have, however, not been eliminated, and an object of this invention is to achieve an improvement in the state of art.

SUMMARY OF THE INVENTION

According to the present invention the adhesive to be used in the manufacture of plywood, fiber board, particle board, and similar wood products comprises the combination of a phenol formaldehyde resin and lignin derivatives, such as lignosulfonates or alkali salts of alkali lignins. It has been unexpectedly discovered that the molecular weight of the lignin derivatives is of critical significance as far as the adhesive characteristics of the product is concerned, thus at least 65% and preferably over 70% by weight of the lignosulfonates should have molecular weights over that of Glucagon, and at least 40%, and preferably over 45% by weight of the alkali lignins should have molecular weights in excess of that of Glucagon as determined by gel chromatography.

Another essential attribute of this invention is that the lignosulfonates and alkali lignins are present in the adhesive in the form of alkali or earth alkali salt, i.e. in alkaline form, and not in free acid form.

When using the invented adhesives, the same manufacturing conditions, such as pressing times and temperatures, can be used as when using commercial phenol formaldehyde resins for example in the manufacture of plywood. Since the plywood thus manufactured fulfills the requirements set for exterior grade plywood, and the lignin derivatives used in the adhesive are considerably cheaper than phenol formaldehyde resins, the use of the invented adhesive is economically advantageous.

Weatherproof particle board can be manufactured when using the invented adhesive. This is a noteworthy advantage, because a board glued with phenol formaldehyde is not weatherproof as is mentioned in the publication "Fenoliliimatun lastulevyn ominaisuuksista ja niiden tutkimisesta" (About the properties of phenol-glued particle board and the study thereof) in the bulletin Sarja I-Puu 42 (Series I - Wood 42, 1968) of the State Institute of Technical Research of Finland. The advantage of the manufacturing method as compared with other processes employing spent sulfite liquor or lignosulfonates include the one-phase hardening process of the boards and the short pressing time needed. A further advantage obtained by using predominantly high-molecular-weight alkali lignin or lignosulfonates resides in the fact that it is usually not necessary to chemically pretreat the lignin before mixing it with the phenol-formaldehyde resin, e.g. pre-reacting it with phenol, formaldehyde, phenolformaldehyde resin, etc.

Due to the fact that the strong lignosulfonic acids are neutralized and the alkali lignin is present in the adhesive in the alkaline form and not in the free acid form, the adhesive does not cause corrosion or hydrolytic defects to the wood products as when using acid adhesives. For the same reason it is usually not necessary to include organic solvents in the adhesive formulations; on the contrary, in most cases the adhesive can be prepared as a water solution.

The above mentioned advantages of the invention have an extremely beneficial effect upon the economic aspects of the manufacturing method on an industrial scale.

The molecular weight distributions of lignosulfonates and alkali lignins characteristic of the adhesives of the present invention are determined by the gel chromatography method described for example by Whitaker, J. R., Anal. Chem. Vol. 35, No. 12, November 1963, pages 1950-1953; Forss K. G. and Stenlund B. G., Paper and Timber 48 (1966), Vol. 9, pages 565-574 and Vol. 11, pages 673-676; and Forss K. G., Stenlund B. G. and Såfors P.-E., Applied Polymer Symposium No. 28, 1185-1194 (1976) by John Wiley & Sons, Inc. In the method the test samples are eluted through a gel chromatography column. The molecular weight distributions are determined on the ground of the correlation between the molecular weights and corresponding retention volumes. This correlation can be established by determination of the molecular weights of the different fractions by means of the light-scattering method, osmometry or by means of ultracentrifugation techniques, but these methods are very tedious, and for practical purposes it is therefore appropriate to calibrate the gel chromatography column with the aid of easily available substances with known molecular weights.

DESCRIPTION OF THE PREFERRED EMBODIMENT

Figure 3:
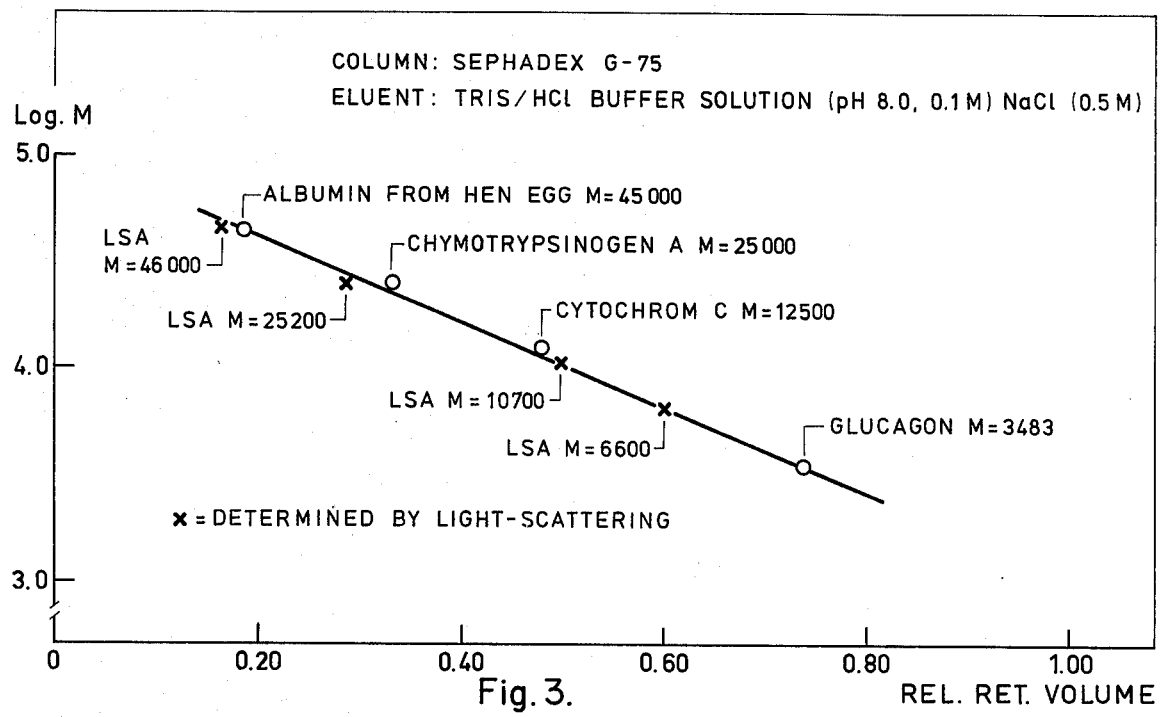

The lignin derivative can be lignosulfonates produced from spent sulfite liquor which is the by-product of pulping natural lignocellulose material with bisulfite and sulfur dioxide, or alkali lignins from alkalin pulping processes, for example the soda process, wherein the pulping liquor contains sodium hydroxide or the sulfate process wherein the pulping liquor contains sodium hydroxide or the sulfate process wherein the pulping liquor contains both sodium hydroxide and sodium sulfide and hydrosulfide, or the oxygen-alkali pulping process, where pulping is performed with sodium hydroxide in the presence of oxygen.

The molecular weight distribution of the lignin derivatives is such that at least 65%, properly over 70%, and preferably over 75% by weight of lignosulfonates have molecular weights in excess of that of Glucagon, that at least 40%, properly over 45% or 50% and preferably over 55% by weight of the alkali lignins have molecular weights in excess of that of Glucagon. The molecular weight distributions of the lignin derivatives may be disclosed also in such a way that at least 55%, properly 60%, and preferably 65% by weight of the lignosulfonates shall have molecular weights in excess of 5000, and at least 35%, properly over 40% or 45%, and preferably over 50% by weight of the alkali lignins shall have molecular weights in excess of 5000 as determined by gel chromatography calibrated by calibration substances with known molecular weights.

Lignosulfonates and alkali lignins with a molecular weight distribution required by the invention, may be obtained, from spent sulfite liquor or black liquor, for example in a manner described in U.S. Pat. No. 3,825,526, or by any kind of precipitation, or by ultrafiltration for example, as disclosed in Finnish Patent application Ser. No. 362 6/72 of Jantzen, L. and Clausen, P. H., or by any other method.

The suitability of lignosulfonates for use in the manufacture of the invented adhesive can also be determined by the aid of viscosity. The viscosity of a neutral solution containing 50% by weight of lignosulfonates exceeds 10,000 cP when measured at a temperature of 23° C by means of a Brookfield RVT viscosimeter at 50 rpm.

The lignosulfonates and the alkali lignins are used in the adhesive in the form of alkali metal or alkaline earth metal salts, possibly containing the hydroxide or a salt of the alkali metal or alkaline earth metal in such amount that the pH value of the solution of the adhesive is in excess of 7, preferably between 8 and 13.

The invented adhesive is obtained by mixing the lignin derivative and phenol formaldehyde resin usually as water solutions. The two basic classes of phenol formaldehyde resins are resoles and novolacs and both types can be used in the invention. Resoles are prepared using an alkaline catalyst with the weight ratio of phenol to formaldehyde generally being in the range of 1:1 to 1:5. Novolacs can be prepared using either an acid or alkaline catalyst, although an acid such as oxalic acid is preferred. The phenol to formaldehyde ratio is generally in the range of 1:0.8 to 1:1. Novolacs require the addition of a curing agent, such as paraformaldehyde, hexamethylenetetramine or furfural.

The weight ratio of the lignin derivative to the phenol formaldehyde resin when used for plywood is 70:30 to 20:80, and for particle board and corresponding products, 90:10 to 20:80. The solid content of the adhesive depends on the application, for example in fiber board production the adhesive may be added to the fiber suspension as a dilute water solution with a solid content of 5%, in plywood manufacture the solid content of the adhesive solution without additives may be 30% and in particle board production the solid content may be 50%, these figures being only examples and not limitations of the invention. It is also possible to apply the lignin or the phenol-formaldehyde resin or both as dry powders.

Traditional extenders, such as chalk, quebracho, wood flour and wheat flour, may be used in the adhesive. Furthermore may hardeners, such as formaldehyde, paraformaldehyde, furfural be added to the adhesive.

When manufacturing particle board using the invented adhesive, for instance paraffin may be added to the adhesive or to the chips separately in order to improve the water-resistance of the board.

Figure 6:
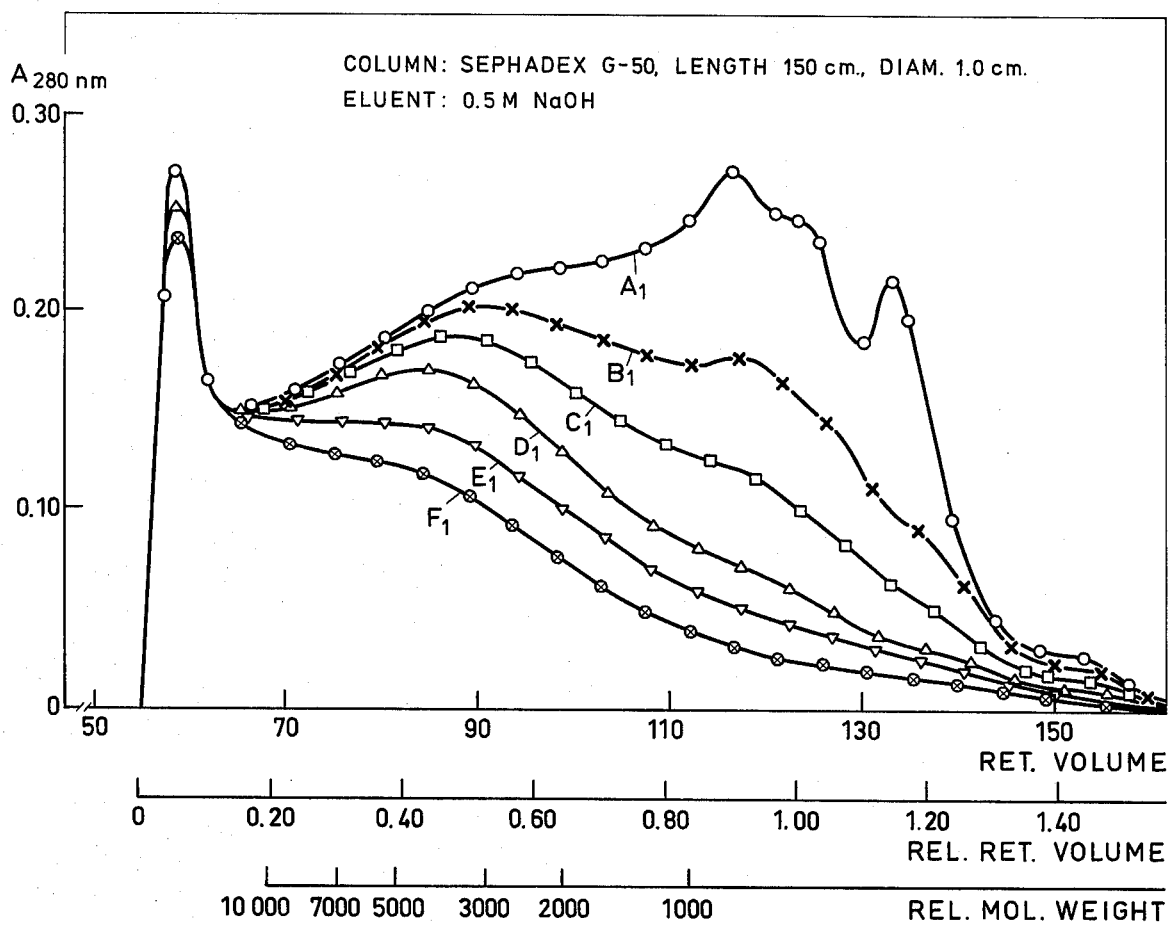
Figure 7:
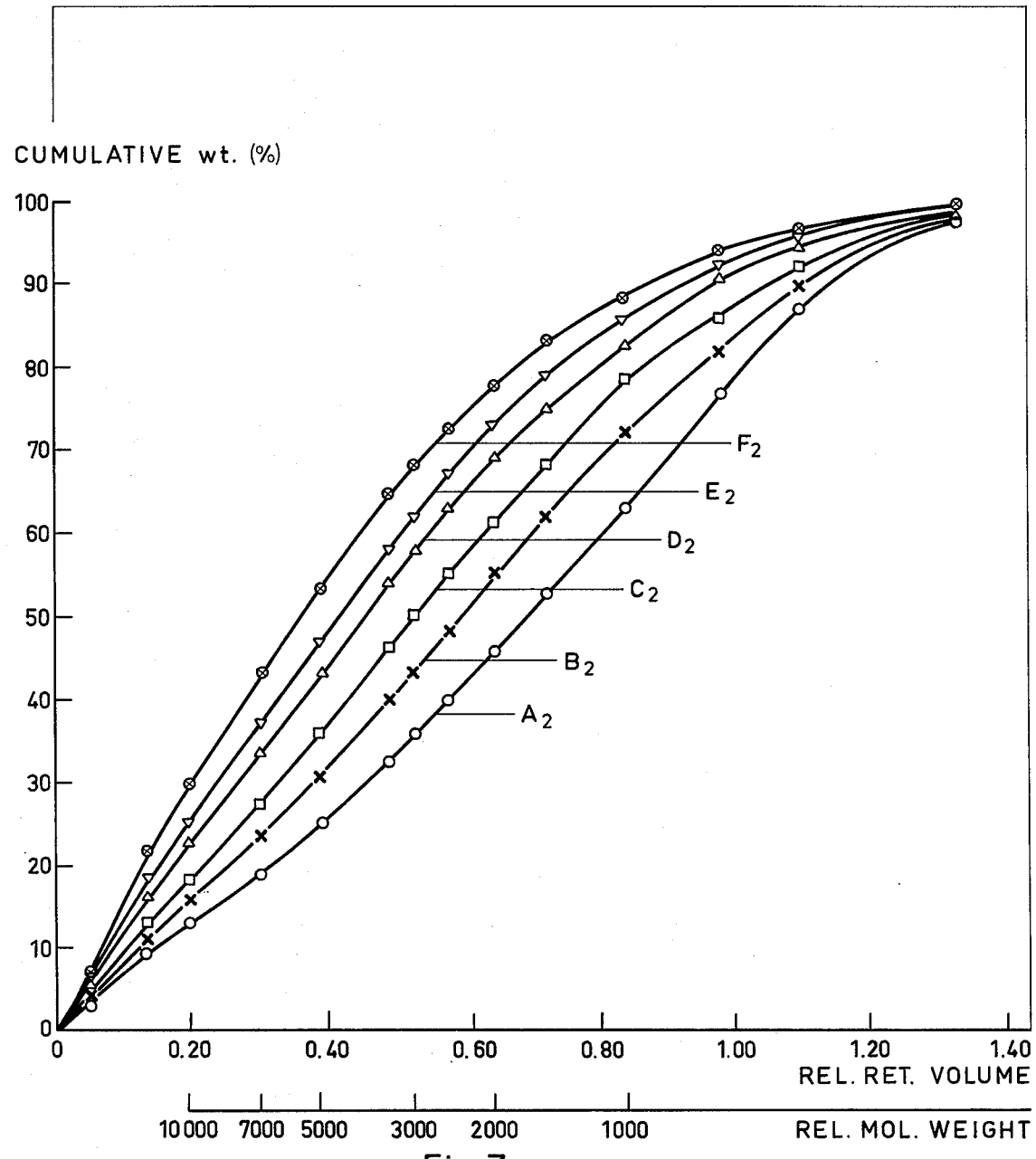

The invention is further described in the following with the reference to the accompanying drawings in which:

FIGS. 1 and 2 show the elution of calibration substances and internal standards through gel chromatography columns of Sephadex G-75 and Sephadex G-50 determined by the absorbance at 280 nm, FIGS. 3 and 4 show the logaritms of the molecular weight versus the relative retention volume for the calibration substances in columns Sephadex G-75 and Sephadex G-50, FIGS. 5a and b shows gel chromatograms and molecular weight distributions of unfrationated (A') and fractionated (B') lignosulfonates from a spent sulfite liquor from Western Hemlock, FIG. 6 shows gel chromatograms of unfractioned (A) and fractionated (B, C, D, E and F) lignins from a kraft cook of Scots Pine, and FIG. 7 shows cumulative molecular weight distribution corresponding chromatograms in FIG. 6.

EXAMPLE 1

(Comparative Example)

The following example illustrates the suitability of two commercially available lignosulfonate products and spent sulfite liquor as components in the adhesive. The pH, molecular-weight distribution and viscosity values of these three products are given in Table I.

TABLE I

|  | ligno-sulfonate product 1 | ligno-sulfonate product 2 | spent sulfite liquor |
|---|---|---|---|
| pH | 7.6 | 6.8 | 5.0 |
| proportion of lignosulfonates with molecular-weights | 42 | 45 | 44 |

TABLE I-continued

|  | ligno-sulfonate product 1 | ligno-sulfonate product 2 | spent sulfite liquor |
|---|---|---|---|
| >5,000, % (w/w) viscosity of water solution, solid content 50 % by weight, Brookfield RVT, 23° C, cP | 720 | 170 | 100 |

The adhesives were prepared in the followig way:

160 g of lignosulfonate product 1 or 2 was dissolved in 240 g of water and the solution was mixed with 600 g of commercial resole-type phenol formaldehyde was added.

55% technical spent sulfite liquor was diluted to 40% and 400 g of this solution was mixed with 600 g of commercial resole-type formaldehyde resin having a solid content of 40%. 10 g of paraformaldehyde was added.

The adhesives were mixed for a period of 60 minutes and thereupon spread on 1.5 mm thick birch veneers having a moisture content of 4%. The glue spread on each side of the veneer was 150 g/m². 3-ply panels were manufactured. The pre-pressing pressure was 5 kp/cm² and the pressing time was 5 minutes. The hot pressing temperature was 135° C, pressure 16 kp/cm² and the pressing time was 4 minutes.

Using the same pressing conditions and glue spread, 3-ply panels were manufactured for comparison, using commercial phenol formaldehyde resin as an adhesive, paraformaldehyde (adhesive 1) as a hardener and quebracho, chalk, wood powder and wheat flour (adhesive 2) as extenders.

5 panels were prepared using each adhesive and the properties of the boards were determined according to Finnish Plywood Standard O.IV.L. (Table II) (the data are average values of 25 test pieces).

TABLE II

|  | dry | | after boiling | |
|---|---|---|---|---|
|  | shear stress | wood failure | shear stress | wood failure |
| Lignosulfonate product 1 | 21.9 kp/cm² | 37% | 13.2 kp/cm² | 30% |
| lignosulfonate product 2 | 23.6 " | 40% | 10.2 " | 14% |
| spent sulfite liquor | 16.9 " | 14% | 2.3 " | 0% |
| commercial phenol formaldehyde resin in (Adhesive 1) | 32.6 " | 90% | 21.4 " | 85% |
| commercial phenol formaldehyde resin in (Adhesive 2) | 34.4 " | 93% | 18.1 " | 91 " |

The properties of the panels where lignosulfonate product 1 or 2, or where spent sulfite liquor mixed with phenol formaldehyde resin was used as an adhesive, did not meet the requirements of the Finnish standard, which are:

| dry | shear stress | ≧20.9 kp/cm², or |
|---|---|---|
|  | wood failure | ≧50% |
| after boiling | shear stress | ≧14.1 kp/cm², or |
|  | wood failure | ≧50% |

EXAMPLE 2

Manufacturing of plywood using the lignosulfonates having the molecular weight distribution as required by the invention.

Sodium lignosulfonates, of which 67% (w/w) had molecular with the weight percentage of weights exceeding 5,000, were used in the manufacture of the adhesive. A water solution containing 50% (w/w) of these lignosulfonates had a viscosity of >80,000 cP (Brookfield RVT viscosimeter, 50 rpm, 23° C). A water solution containing 10% of these lignosulfonates had a pH of 8.2.

160 g of these lignosulfonates were dissolved in 240 g of water. The solution was mixed with 600 g of a resole-type phenol formaldehyde resin, having a solid content of 40%. 10 g of paraformaldehyde was added and the adhesive was mixed for 60 minutes. The viscosity of the adhesive was 216 cP at 23° C.

The manufacturing procedure of the plywood was identical with that of example 1. Five panels were made, five test pieces were taken from each of them for the determination of shear stress and five for the determination of shear stress after boiling. The results of the determinations are given in Table III (average values of 25 test pieces as well as confidence limits in 95% probability).

TABLE III

|  | dry | after boiling |
|---|---|---|
| shear stress | 35.1 ± 1.7 kp/cm² | 22.2 ± 1.2 kp/cm² |
| wood failure | 94% | 91% |

The panels fully met the requirements of the Finnish standard for exterior grade plywood, and have properties corresponding to those obtained when using commercial phenol formaldehyde resin.

EXAMPLE 3

Sodium lignosulfates of which 83% (w/w) had molecular weights exceeding 5,000, were used in the preparation of the adhesive. A water solution containing 50% lignosulfonates had a viscosity >80,000 cP (Brookfield RVT viscosimeter, 50 rpm, 23° C). The pH of a 10% water solution was 8.4. The adhesive was prepared as in Example 2. The viscosity of the adhesive was 640 cP.

3-ply plywood panels were manufactured as in Example 1. Five test pieces were taken from each of the five panels manufactured for the determination of shear stress and five test pieces for the determination of the shear stress after boiling. The properties of the boards are given in Table IV (average values of 25 test pieces as well as confidence limits in 95% probability).

TABLE IV

|  | Dry | After boiling |
|---|---|---|
| Shear stress | 36.2 ± 1.2 kp/cm² | 20.0 ± 1.5 kp/cm² |
| wood failure | 93% | 90% |

EXAMPLE 4

Sodium lignosulfonates, of which 61% (w/w) had molecular weights exceeding 5,000, were used in the manufacture of the adhesive. A water solution containing 50% of these lignosulfonates had a viscosity of >80,000 cP (Brookfield RVT viscosimeter, 50 rpm, 23° C). The pH of a 10% water solution was 7.6.

160 g of these lignosulfonates were dissolved in 300 g of water. The solution was mixed with 600 g of resole-type phenol formaldehyde resin having a solid content of 40%. 5 g of paraformaldehyde, 10 g of wheat flour, 10 g of chalk and 20 g of wood powder were added to this solution. The adhesive was mixed for 60 minutes. Immediately after mixing the viscosity was 600 cP and after 48 hours 712 cP.

The manufacturing procedure of the panels was identical with that of Example 1. Five test pieces were taken from each of the five boards manufactured for the determination of shear stress and similarly, five for the determination of shear stress after boiling. The properties of the boards are given in Table V (average values of 25 test pieces as well as confidence limits in 95% probability).

TABLE V

|  | Dry | After boiling |
|---|---|---|
| Shear stress | 33.8 ± 3.6 kp/cm² | 20.2 ± 1.4 kp/cm² |
| Wood failure | 93% | 90% |

EXAMPLE 5

Manufacturing of particle boards.

Sodium lignosulfonates were used in the manufacture of the adhesive. 57% (w/w) of the lignosulfonates had molecular weights exceeding 5,000. The 50% water solution of these lignosulfonates had a viscosity of >80,000 cP (Brookfield RVT viscosimeter, 50 rpm, 23° C). The pH of 10% water solution was 7.8.

1000 g of these lignosulfonates were dissolved in 970 g of water. 100 g of sodium hydroxide was added to the water solution. 2500 g of commercial resole-type phenol formaldehyde resin, having a solid content of 40%, was mixed for a period of 60 minutes.

The adhesive thus prepared was sprayed onto birch wood chips having a moisture content of 2.1% and used in the outer layer of the manufactured board. The chips for the inner layer had a moisture content of 3.0%.

Calculated as dry matter the adhesive sprayed amounted to 12% of the dry surface chips and 10% of the dry inner part chips. 1% of paraffin, as calculated from the dry weight of the chips, was added to the adhesive before spraying.

3-layer boards were manufactured, consisting of 40% of outer layer chips and 60% of inner layer chips with a weight by volume of approximately 750 kg/m³ and a nominal thickness of 15 mm. The pressure was 27 kp/cm² and pressing time 60 sec/thickness (mm) and temperature 215° C.

The strength properties of the particle boards were determined according to Finnish Standard O.IV.2, and the swelling properties and the tensile strength (V100) after soaking in cold and boiling water according to German Standard DIN 58761. The properties of the board manufactured were as follows:

| Bending strength | 227 kp/cm² |
|---|---|
| Tensile strength | 6.0 " |
| Thickness swelling 2 h. | 1.7% |
| Thickness swelling 24 h. | 10.3% |
| V 100 test | 4.0 kp/cm² |

The requirements according to the standards are: Bending strength at least 180 kp/cm², tensile strength at least 3.5 kp/cm² thickness swelling 2 h not more than 6%, 24 h not more than 12%, and after the V 100 treatment tensile strength at least 1.5 kp/cm². As is evident from the example, these requirements are amply surpassed.

EXAMPLE 6

Sodium lignosulfonates weree used in the manufacture of the adhesive. 62% (w/w) of the lignosulfonates had molecular weights exceeding 5000. The 50% water solution of these lignosulfonates had a viscosity of >80,000 cP (Brookfield RVT viscosimeter, 50 rpm, 23° C). The pH of a 10% water solution was 7.3.

1000 g of these lignosulfonates were dissolved in 1140 g of water. 100 g of sodium hydroxide was added to the water solution. 1670 g of commercial resole-type phenol formaldehyde resin was mixed with the solution. The solid content of the resin was 40%. 37 g of paraformaldehyde was added and the solution was mixed for 60 minutes.

Particle boards with 3 layers were manufactured. The manufacturing conditions, weight by volume and nominal thickness were identical with those of Example 5. The properties of the boards manufactured were as follows:

| | |
|---|---|
| Bending strength | 235 kp/cm$^2$ |
| Tensile strength | 7.0 kp/cm$^2$ |
| Thickness swelling 2 h | 2.0% |
| Thickness swelling 24 h | 11.9% |
| V 100 test | 2.2 kp/cm$^2$ |

EXAMPLE 7

The following example illustrates the suitability of two black liquor products for preparing the binder.

One agent was black liquor, evaporated to a solid content of 37%, the other was alkali lignin obtained from black liquor by precipitating with acid. This alkali lignin had been dissolved into NaOH-solution after filtration and washing.

Table 6

| | black liquor | with alkali precipitated alkali lignin dissolved into NaOH-solution |
|---|---|---|
| solid content | 37.% | 37.5% |
| pH | 12.7 | 12.2 |
| viscosity measured by Brookfield RVT-viscosimeter, 23° C | 43 cP | 3,336 cP |
| molecular weight distribution, % w/w exceeding M | | |
| M > 5000 | 25% | 32% |
| M > 10000 | 14% | 18% |
| M > 15000 | 9% | 11% |

The binders were prepared as follows:

450 g of NaOH-solution of acid-precipitated alkali lignin was mixed with 550 g of commercial resole-type phenol formaldehyde resin with a solid content of 46%.

84 g of a composition containing 30 parts by weight of wood powder, 50 parts by weight of chalk, and 20 parts by weight of wheat flour was added to the solution.

The binder was spread on birch veneers 1.5 mm thick with a moisture content of about 3%. The glue spread on each side of the veneer was 150 g/m$^2$. 3-ply panels were prepared. Prepressing pressure was 7 kp/cm$^2$ and time 7 minutes. Hot pressing temperature was 135° C, pressure 16 kp/cm$^2$, and time 4 minutes and 2 minutes. Properties of the prepared panels as determined according to Finnish Standard O.IV.1 are illustrated in Table 7.

TABLE 7

| | pressing time min | dry shear stress kp/cm$^2$ | dry wood failure % | after boiling shear stress kp/cm$^2$ | after boiling wood failure % |
|---|---|---|---|---|---|
| black liquor | 2 | 26.4 | 57 | 16.0 | 8 |
| | 4 | 28.5 | 73 | 16.8 | 12 |
| acid-precipitated alkali lignin | 2 | 26.4 | 68 | 16.0 | 23 |
| | 4 | 28.1 | 76 | 18.0 | 27 |
| Finnish standard | | ≧20.9 | ≧50 | ≧14.1 | ≧50 |

Table 7 indicates that, by using both adhesive compositions, it was possible to prepare plywood yielding shear stress values which meet the requirements set by Finish standard O.IV.1. Wood failure, which is of primary importance considering the weather proofness of the product, did not, however, meet the requirements. As shown in Table 7 these values could not be improved even by double pressing time.

EXAMPLE 8

Preparation of plywood using alkali lignin in the adhesive having a molecular weight distribution as required by the invention.

Alkali lignin derivative which was separated from black liquor and had the following properties was used for the preparation of the binder:

TABLE 8

| | lignin derivative separated from black liquor dissolved into NaOH solution |
|---|---|
| solid content | 37.5% |
| pH | 11.5 |
| viscosity measured by Brookfield RVT-viscosimeter, 23° C. | 45.480 cP |
| molecular weight distribution, % (w/w) exceeding M: | |
| M > 5000 | 58% |
| M > 10000 | 38% |
| M > 15000 | 24% |

450 g of NaOH-solution of the above mentioned lignin derivative was mixed into 550 g of a resole-type phenol formaldehyde resin with a solid content of 46%. Viscosity of the mixture was 388 cP at 23° C. 84 g of a composition containing 30 weight parts wood powder, 50 weight parts chalk, and 20 weight parts wheat flour was added to this solution. After this addition, the viscosity was 1000 cP at 23° C.

The manufacturing conditions of plywood were the same as in Example 7.

The properties of the plywood boards appear in the following table:

TABLE 9

| pressing time min | dry shear stress kp/cm$^2$ | dry wood failure % | after boiling shear stress kp/cm$^2$ | after boiling wood failure % |
|---|---|---|---|---|
| 2 | 30.1 | 89 | 17.3 | 80 |
| 4 | 32.0 | 91 | 20.0 | 96 |

The panels completely met the requirements of Finnish standard 0.VI.1 for exterior grade plywood.

EXAMPLE 9

Preparation of particle board.

The binder was prepared using the same alkali lignin as in Example 8. 540 g of a 46% water solution containing 210 g of alkali lignin and 40 g NaOH was mixed into 460 g of commercial resole-type phenol formaldehyde resin solution with a solids content of 46%. The viscosity of the adhesive was 1040 cP at 23° C and the pH was 12.0.

184 g of paraffin emulsion (solid content 50%) was mixed into the adhesive, the viscosity thereafter being 850 cP (23° C, measured by Brookfield RVT-viscosimeter).

3-ply particle board containing 30% outer layer chips and 70% inner layer chips was prepared. The dry matter of the adhesive sprayed amounted to 12% of the dry surface chips and 10% of the dry inner layer chips. Prior to gluing the moisture content of the chips was approximately 1% and after the gluing about 11%. The board thickness was 15 mm and volume weight 750 kg/m$^3$. Pressing temperature was 210° C, pressure 27 kp/cm$^2$, and time 60 sec/mm. The board properties appearing in the following table were determined according to German standard DIN 52360-65 and 68761.

TABLE 10

| | bending strength kp/cm$^2$ | tensile strength kp/cm$^2$ | thickness 2 h % | swelling 24 h % | V100 kp/cm$^2$ |
|---|---|---|---|---|---|
| binder of the invention | 208 | 6.2 | 1.9 | 12.9 | 2.5 |
| requirements according to DIN | ≧180 | ≧3.5 | ≦6.0 | ≦12.0 | ≧1.5 |

As it appears from Table 10, the binder of the invention can be used in preparation of particle boards which meet the West German requirements for weatherproof particle boards.

Examples 10-35 described below are illustrative of the employment of lignosulfonate and alkali lignin preparations in adhesive formulation according to the present invention. Data respecting their employment in the production of plywood are presented in tabular form. The chromatograms and molecular-weight distributions of some alkali lignin preparations are shown in FIG. 6 and FIG. 7.

The molecular weight distributions of unfractionated and fractionated alkali lignins and lignosulfonates were determined in examples 10-35 as follows:

Sames of lignosulfonates and alkali lignins were analyzed by gel chromatography on Sephadex columns 150 cm long and 1 cm in diameter. Lignosulfonates were eluted through Sephadex G-75 using Tris/HCL buffer solution (pH 8.0, 0.1 M) containing NaCl (0.5 M) as eluent whereas alkali lignins, dissolved in aqueous sodium hydroxide, were eluted through Sephadex G-50 using 0.5 M sodium hydroxide solution as eluent. The rate of elution was 20 ml/h.

The concentration of lignins in the effluent fractions was determined by the absorbance at 280 nm. The retention volume was determined by weighting the effluent fractions. In order to obtain results independent on the packing density of the gel, a relative retention volume scale was introduced by using two calibration substances as internal standards. The retention volume of the rising slope for the peak of Blue Dextran (M=2·10$^6$) was taken as the first reference point giving the value 0 on the relative retention volume scale whereas the second reference point, giving the value 1.0 on the relative retention volume scale, was obtained by determining the peak retention volume of sulfosalicylic acid (M=218), FIG. 1 Sephadex G-75 and FIG. 2 Sephadex G-50. Simultaneously the columns were calibrated by determination of the relationship between the logarithm of the molecular weight and the relative retention volume for a selection of easily available commercial substances with known molecular weights. The Sephadex G-75 column was calibrated using Albumin from egg (M=45 000), Chymotrypsinogen A (M=25 000), Cytochrom C (M=12 500), and Glucagon (M=3483) as reference substances and Tris/HCl buffer solution (pH 8.0, 0.1 M) containing NaCl (0.5) as eluent (FIG. 1 and FIG. 3). The Sephadex G-50 column was calibrated against Cytochrom C, Glucagon and Bacitracin (M=1423) using 0.5 M sodium hydroxide as eluent, FIG. 2 and FIG. 4.

Thus the part of the lignin derivatives in the samples eluting through the gel chromatography column faster than Glucagon, i.e. at lower relative retention volume, composed of molecules having molecular weights in excess of 3483 (Glucagon).

EXAMPLE 10

Black liquor from a kraft cook on pine wood (*Pinus silvestris*) was evaporated to a solid content of 33%. The pH value of the solution was 12.7. The molecular weight distribution was determined with the aid of a Sephadex G-50 column according to the method described above. The chromatogram obtained is shown in FIG. 6 (A). The molecular weight distribution, FIG. 7 (A), was calculated with aid of a calibration curve, FIG. 4. According to this 32.9% (w/w) of the alkali lignins in the black liquor had molecular weights exceeding 3483 as related to Glucagon, and 25.3% (w/w) had molecular weights in excess of 5000.

A commercial phenol-formaldehyde resin was employed. This A stage resole contained 46% solids, had a viscosity of 70 centipoises at 25° C measured with a Brookfield RVT viscosimeter, and a pH value of 11.3. It was water-soluble and relatively low advanced.

An adhesive was prepared by mixing 402 g of the evaporated black liquor (33% solids) with 434 g of the phenolic resin (46% solids). 27 g of sodium hydroxide solution (50% solids) was added and the mixture was subjected to agitation for 10 minutes. After this 138 g of additives consisting of 63 g of chalk, 33 g of quebracho, 28 g of wood flour and 14 g of wheat flour were added. The glue mix was thoroughly mixed for 30 minutes until it was uniform. The viscosity of the glue mix was 166 centipoises at 25° C, measured with a Brookfield RVT viscosimeter. The pH was 12.3. The black liquor: resole ratio on a solid basis was 40:60.

EXAMPLE 11

Alkali lignin was precipitated from the black liquor used in example 10 with hydrochloric acid. The precipitated lignin was filtered, washed and dissolved into a sodium hydroxide solution. The pH of the solution was 12.2 and the solid content was 33.0%. The molecular weight distribution was determined according to the method described above, according to which 38.0% (w/w) of the alkali lignins had molecular weights exceeding 3483 as related to Glucagon and 29.0% (w/w) in excess of 5000.

An adhesive was prepared in the same manner and using the same commercial phenol-formaldehyde resin as in example 10. The viscosity of the glue mix was 284 centipoises measured at 25° C with a Brookfield RVT-viscosimeter. The pH was 12.2 and the alkali lignin: resole ratio on a solid basis was 40:60.

EXAMPLE 12

Alkali lignin was precipitated from the black liquor of example 10, using carbon dioxide. The precipitated alkali lignin was filtered, washed and dissolved into a sodium hydroxide solution. The pH of the alkali lignin solution was 12.0 and the solid content 33%. The molecular weight distribution was determined according to the method described above. Of the alkali lignins 44.2% (w/w) had molecular weights exceeding 3483, as related to Glucagon and 34% (w/w) in excess of 5000.

Using the same phenol-formaldehyde resin and the same formulation as in example 10, an adhesive of pH 12.2 was prepared, by the method described above. Of the alkali lignins 44.2% (w/w) had molecular weights exceeding 3483, as related to Glucagon and 34% (w/w) in excess of 5000.

In the glue mix prepared, the lignin: resole ratio on a solid basis was 40:60. The viscosity of the glue mix was 528 cP at 25° C measured with a Brookfield RVT-viscosimeter.

EXAMPLE 13

The black liquor of example 10 was subjected to ultrafiltration giving an alkali lignin fraction with a molecular weight distribution, shown in FIG. 7, curve B. 440% (w/w) of the alkali lignins had molecular weights exceeding 3483 as related to Glucagon and 30.9% exceeding 5000. The solid content of the alkali lignin solution was 33% after evaporation and pH 12.1. An adhesive was prepared using the same formulation as in example 10. The viscosity of the glue mix was 160 cP at 25° C, measured with a Brookfield RVT-viscosimeter.

EXAMPLE 14

An alkali lignin fraction was separated from the black liquor in example 10, by means of ultrafiltration. The molecular weight distribution is shown in FIG. 7, curve C. 46.2% (w/w) of the alkali lignins had molecular weight exceeding 3483 as related to Glucagon and 36.0% (w/w) in excess of 5000. The viscosity of the glue mix, prepared as in example 10, was 168 cP at 25° C, measured with a Brookfield RVT-viscosimeter.

EXAMPLE 15

An alkali lignin fraction was separated from a black liquor of a Finnish pulp mill by means of ultrafiltration. The molecular weight distribution was determined according to the method described above the 42.0% (w/w) of the alkali lignins had molecular weights exceeding 3483 as related to Glucagon and 31.0% (w/w) in excess of 5000. The pH of the solution was 11.0 and the liquor was evaporated to a solid content of 33.0%. An adhesive was prepared using the same phenol formaldehyde resin and formulation as in example 10. The viscosity of the glue mix was 420 cP at 25° C, measured with a Brookfield RVT-viscosimeter.

EXAMPLE 16

The black liquor of example 15 was subjected to ultrafiltration and an alkali lignin fraction was separated. The molecular weight distribution was determined. 50.0 % (w/w) of the alkali lignins had molecular weights exceeding 3483 as related to Glucagon and 41.0% (w/w) exceeding 5000. An adhesive was prepared using the same formulation as in example 10. The pH of the alkali lignins was 10.8 and the pH of the glue mix was 11.3. The viscosity of the glue mix measured at 25° C with a Brookfield RVT-viscosimeter was 1520 cP.

EXAMPLE 17

An alkali lignin fraction was isolated from the black liquor of example 10 by ultrafiltration, according to the chromathogram, curve D, FIG. 7, 54.1 % (w/w) of the isolated alkali lignin had molecular weight exceeding 3483 as related to Glucagon and 43.2% (w/w) exceeding 5000. The pH of the solution was 12.0 and it was evaporated to a solid content of 33%. An adhesive was prepared using the same phenol-formaldehyde resin and formulation as in example 1. The viscosity of the glue mix was 2600 cP at 25° C, measured with a Brookfield RVT-viscosimeter. The alkali lignin: phenol-formaldehyde resin ratio was 40:60 (on solid basis).

EXAMPLE 18

An alkali lignin fraction was isolated from the black liquor of example 10 by means of ultrafiltration. Of this alkali lignin preparation 57.7% (w/w) had molecular weights exceeding 3483 as related to Glucagon and 46.9% exceeding 5000, chromatogram E, FIG. 6, curve E, FIG. 7. The pH of the alkali lignins was 12.0. The alkali lignins: resole ratio on solid basis was 40:60, and the same phenol-formaldehyde resin and glue mix formulation was used as in example 1. The viscosity of the glue mix was 2750 cP measured with a Brookfield RVT-viscosimeter at 25° C.

EXAMPLE 19

A high-molecular-weight alkali lignin fraction was isolated from the black liquor of example 10 using ultrafiltration. Of the molecular species 64.7% had molecular weight exceeding 3483 as related to Glucagon and 53.4% exceeding 5000. The pH of the alkali lignin solution was 9.6. An adhesive was prepared using the same formulation as in example 1. The viscosity of the glue mix was 3600 cP measured at 25° C with a Brookfield RVT-viscosimeter.

The adhesive compositions of examples 10–19 were employed for the manufacture of 3-ply plywood panels from Finnish birch veneer of a 1.5 mm thickness and with a moisture content of 2–3%. The glue spread was 62 lbs/Mdgl and the prepressing conditions were: pressure 100 p.s.i. and time 6 minutes. The panels were hot-pressed at a temperature of 275° F at 230 p.s.i. pressure, using the pressing times 2 and 4 minutes. The panels were tested according to the Finnish standard SFS 2415 and 2416 i.e. the shear stress and wood failure, dry and after boiling were determined. Table II showing the test results of examples 10–19, indicates that is was possible to prepare plywood with shear stress values which meet the requirements set by the Finnish standards, by using the alkali lignin raw-materials in examples 13–19. However, the wood failure, which is of primary importance considering the weather proofness of the product did not meet the requirements when using black liquor, hydrochloric acid or carbon dioxide precipitated alkali lignin. This property could not be improved even by doubling the pressing time.

Of the ultrafiltered alkali lignin preparations, only those of which the molecular weight distribution met the requirements according to the present invention, gave wood failures dry and after boiling exceeding 80–90%, which is in fact in practice required of exterior grade plywood.

determined by the method described above. According to this 59.8% (w/w) of the lignosulfonates had molecular weight exceeding 3483 and 50.3% exceeding 5000.

TABLE 11

| Ex. No. | Mol. weights <3483 % (w/w) | Pressing time min. | 3-ply panels, properties | | | |
|---|---|---|---|---|---|---|
| | | | dry | | after boiling | |
| | | | shear stress p.s.i. | wood failure % | shear stress p.s.i. | wood failure % |
| 10 | 32.9 | 2 | 375 | 57 | 227 | 8 |
| | | 4 | 405 | 73 | 239 | 12 |
| 11 | 38.0 | 2 | 380 | 68 | 228 | 23 |
| | | 4 | 400 | 76 | 256 | 27 |
| 12 | 40.0 | 2 | 340 | 40 | 270 | 39 |
| | | 4 | 380 | 42 | 228 | 38 |
| 13 | 42.0 | 2 | 375 | 48 | 230 | 65 |
| | | 4 | 390 | 55 | 250 | 70 |
| 14 | 44.2 | 2 | 400 | 65 | 278 | 56 |
| | | 4 | 401 | 78 | 290 | 60 |
| 15 | 46.2 | 2 | 400 | 69 | 228 | 71 |
| | | 4 | 415 | 93 | 270 | 94 |
| 16 | 50.0 | 2 | 425 | 87 | 260 | 72 |
| | | 4 | 410 | 95 | 247 | 95 |
| 17 | 54.1 | 2 | 420 | 98 | 230 | 90 |
| | | 4 | 435 | 100 | 298 | 98 |
| 18 | 57.7 | 2 | 440 | 98 | 237 | 97 |
| | | 4 | 458 | 100 | 287 | 100 |
| 19 | 64.7 | 2 | 445 | 97 | 250 | 98 |
| | | 4 | 442 | 100 | 252 | 99 |

Examples 20–27 describe the employment of a spent sulfite liquor and various fractionated lignosulfonate preparations in adhesives according to the invention. The chromatograms and molecular weight distributions of the lignosulfonates in the spent sulfite liquor and in a linosulfonate fraction are shown in FIG. 5 a and b. Data respecting the employment of the lignosulfonate preparations in the production of plywood is presented in Table 12.

EXAMPLE 20

Spent sulfite liquor from an acid bisulfite cook was evaporated to a solid content of 40%. The pH of the liquor was 5.0 and the viscosity at 25° C was 50 cP. The molecular weight distribution was determined according to the method described above. According to this 47.5% (w/w) of the lignosulfonates had molecular weights exceeding 3483 as related to Glucagon and 39.5% exceeding 5000. A phenol-formaldehyde resin with a solid content of 40%, pH of 11.5 and a viscosity of 70 cP at 25° C, was employed. To 400 g of the 40% spent sulfite liquor was added 600 g of the 40% phenolic resin. The solution was mixed for 15 minutes. 160 g of additives consisting of 74 g of chalk, 38 g of quebracho, 32 g of wood flour, 13 g of wheat flour 3 g of paraformaldehyde was added and mixing was continued for 30 minutes. The viscosity of the glue mix was 180 cP measured at 25° C with a Brookfield RVT-viscosimeter. The pH of the adhesive was 11.2.

EXAMPLE 21

A commercial sodium lignosulfonate product in powder form was dissolved in water, forming a 40% solution. The pH was 6.8 and the viscosity at 25° C was 100 cP. The molecular weight distribution was determined according to the method described above. 52.0% (w/w) of the lignosulfonates had molecular weights exceeding 3400 as related to Glucagon and 43.1% (w/w) exceeding 5000. An adhesive was prepared using the same phenol formaldehyde resin and formulation as in example 20. The viscosity of the adhesive at 25° C was 220 cP and the pH 11.5.

EXAMPLE 22

The spent sulfite liquor of example 20 was subjected to ultrafiltration. The molecular weight distribution was determined by the method described above. According to this 59.8% (w/w) of the lignosulfonates had molecular weight exceeding 3483 and 50.3% exceeding 5000. The lignosulfonate solution obtained was evaporated to 40%. The pH of the solution was 6.0 and the viscosity was 340 cP. An adhesive was prepared using the same phenol formaldehyde resin and formulation as in example 20. The viscosity of the adhesive was 380 cP and the pH 11.6.

EXAMPLE 23

A lignosulfonte fraction was separated from the spent sulfite liquor of example 20 by means of ultrafiltration. 64.5% (w/w) of the lignosulfonates had molecular weights exceeding 3483 as related to Glucagon and 53.8% (w/w) exceeding 5000. The lignosulfonate solution was evaporated to a solid content of 40%. The pH of the solution was 6.0 and the viscosity at 25° C was 380 cP. An adhesive was prepared in the same manner as in example 20. The viscosity of the glue mix was 520 cP at 25° C and the Ph was 11.8.

EXAMPLE 24

A lignosulfonate preparation was obtained from spent sulfite liquor of example 20 by ultrafiltration. 68.7% (w/w) of the lignosulfonates had molecular weights exceeding 3483 as related to Glucagon and 59.3% (w/w) exceeding 5000. The lignosulfonate solution was evaporated to a solid content of 40%. The pH was 5.8 and the viscosity at 25° C was 3430 cP. An adhesive was prepared using the phenol formaldehyde resin and adhesive formulation of example 20. The viscosity of the glue mix was 720 cP at 25° C and the pH 11.7.

EXAMPLE 25

A spent sulfite liquor of a Finish pulp mill was subjected to ultrafiltration. 75.0% (w/w) of the separated lignosulfonates had molecular weights exceeding 3483 as related to Glucagon and 66.8% exceeding 5000. An adhesive was prepared in the same manner as in example 20 from the evaporated 40% lignosulfonate solution with a pH of 6.1. The viscosity of the adhesive was 810 cP at 25° C measured with a Brookfield RVT-viscosimeter.

EXAMPLE 26

A lignosulfonate fraction was prepared by ultrafiltration of the spent sulfite liquor of example 25. The molecular weight distribution was determined according to the method described above. Of the lignosulfonates 81.0% (w/w) had molecular weights exceeding 3483 as related to Glucagon and 74.3% exceeding 5000. The solution was evaporated to a solid content of 40% and an adhesive was manufactured in the same manner as in example 20. The viscosity of the glue mix was 1100 cP, at 25° C. measured with a Brookfield RVT-viscosimeter.

EXAMPLE 27

A high-molecular weight lignosulfonte fraction was isolated from the spent sulfite liquor of example 25 by ultrafiltration. The molecular weight distribution was determined according to the method described above. According to this 86.0% (w/w) of the lignosulfonates had molecular weights exceeding 3483 and 76.8% exceeding 5000. The solution was evaporated to a solid content of 40% and an adhesive was prepared as in example 20. The viscosity of the glue mix was 1260 cP at 25° C measured with a Brookfield RVT-viscosimeter.

using the adhesives of examples 20–27, 3-ply birch plywood panels were prepared. The thickness of the plywood was 1.5 mm and the moisture content 1–2%. The glue spread was 60 lbs/Mdgl and the assembly-time open was 15 minutes. The panels were pre-pressed for 6 minutes with pressure of 100 p.s.i. and hot-pressed at 275° F at 230 p.s.i. using the pressing times 2, 3 and 4 minutes. The panels were tested according to the Finnish standards SFS 2415 and 2416, i.e. the shear stress and wood failure dry and after boiling. Test results are shown in Table 12.

Examples 28–29 illustrate the practice of this invention in the production of Douglas Fir veneer.

EXAMPLE 28

The lignin fraction of example 17 was used in an adhesive composition evaluated for glueing of Douglas Fir veneer. The phenol-formaldehyde resin used in the adhesive, had a solid content of 40%, pH value of 11.5 and a viscosity of 480 cP at 25° C. The glue mix ws prepared in the following way: To 170 g of the 33% alkali lignin solution was added 46 g of water (25° C), 206 g of the phenol-formaldehyde resin (40% solids), 88 g of co-co$\beta$ and 22 g of wheat flour. The glue was mixed for 5 minutes, 30 g of a 50% sodium hydroxide solution was added under stirring. After this 15 g of soda ash was added and the mixing was continued for 30 minutes. 170 g of the alkali lingin solution, 46 g of water and 206 g of the phenol-formaldehyde resin were additionally added and the glue mix was mixed until uniform. the viscosity of the glue mix, measured at 25° C with a Brookfield RVT-viscosimeter was 1500 cP. The lignin: phenol-formaldehyde resin ratio based on dry solids was 40:60 and the pH was 11.9.

EXAMPLE 29

The lignosulfonate fraction of example 26 was employed in an adhesive formulation similar to that in example 28. The viscosity was 2200 cP and pH 11.8. Using the adhesive formulations of example 28 and 29, 5-ply Douglas Fir plywood panels were manufactured using 1/10 and ⅛ veneer. The glue spread was 58 and 65 lbs/Mdgl, pre-pressing time 3 minutes and pressure 200 p.s.i. Assembly time open was 20 minutes and closed 30 minutes. The hot-pressing temperature was 300° F and pressure 200 p.s.i. The pressing times used appear in Table 13. The properties of the panels were determined according to the U.S. Product Standard 1–74 and are shown in Table 13.

TABLE 12

| | | | Visc. Brookfield | | Properties of the panels | | | |
|---|---|---|---|---|---|---|---|---|
| | | | | | dry | | after boiling | |
| Ex. No. | Mol. w. > 3483 % (w/w) | Mol. w. > 5000 % (w/w) | 23° C,50% solution cP | Pressing time min. | shear stress p.s.i. | wood failure % | shear stress p.s.i. | wood failure % |
| 20 | 47.5 | 39.5 | 110 | 2 | 152 | 10 | delaminated | |
| | | | | 4 | 200 | 30 | 90 | 10 |
| 21 | 52.0 | 43.1 | 370 | 2 | 320 | 20 | delaminated | |
| | | | | 4 | 305 | 60 | 190 | 30 |
| 22 | 59.8 | 50.3 | 1320 | 2 | 380 | 60 | 175 | 15 |
| | | | | 4 | 400 | 80 | 220 | 65 |
| 23 | 64.5 | 53.8 | 7000 | 2 | 411 | 75 | 250 | 59 |
| | | | | 4 | 401 | 88 | 248 | 70 |
| 24 | 68.7 | 59.3 | 12000 | 2 | 430 | 82 | 230 | 72 |
| | | | | 4 | 415 | 93 | 241 | 90 |
| 25 | 75.0 | 66.8 | 34000 | 2 | 425 | 95 | 210 | 92 |
| | | | | 4 | 440 | 98 | 223 | 90 |
| 26 | 81.0 | 74.3 | 80000 | 2 | 428 | 96 | 262 | 97 |
| | | | | 4 | 420 | 96 | 250 | 96 |
| 27 | 86.0 | 76.8 | 80000 | 2 | 450 | 97 | 240 | 98 |
| | | | | 4 | 446 | 99 | 238 | 100 |

TABLE 13

| Ex. No. | No. of plies | Thickn. of veneer | Glue spread lbs/ Mdgl | Hot-pressing temp. °F | Hot-pressing time min | Vacuum test shear stress p.s.i. | Vacuum test wood failure % | Boiling test shear stress p.s.i. | Boiling test wood failure % |
|---|---|---|---|---|---|---|---|---|---|
| 28 | 5 | 1/10" | 58 | 300 | 3.5 | 403 | 100 | 330 | 100 |
| | | | | | | 289 | 86 | 294 | 95 |
| | | | | | | 268 | 90 | 250 | 83 |
| | | | | | | 300 | 96 | 270 | 90 |
| | " | " | " | " | 4.5 | 266 | 94 | 228 | 99 |
| | | | | | | 319 | 82 | 303 | 88 |
| | | | | | | 320 | 90 | 310 | 95 |
| | | | | | | 305 | 95 | 300 | 90 |

TABLE 13-continued

| Ex. No. | No. of plies | Thickn. of veneer | Glue spread lbs/ Mdgl | Hot-pressing temp. °F | Hot-pressing time min | Vacuum test shear stress p.s.i. | Vacuum test wood failure % | Boiling test shear stress p.s.i. | Boiling test wood failure % |
|---|---|---|---|---|---|---|---|---|---|
| 29 | 5 | 1/8″ | 65 | 300 | 4 | 364 | 83 | 350 | 80 |
|  |  |  |  |  |  | 359 | 97 | 266 | 96 |
|  |  |  |  |  |  | 365 | 100 | 340 | 100 |
|  |  |  |  |  |  | 380 | 99 | 335 | 100 |
|  | ″ | ″ | ″ | ″ | 4.5 | 320 | 90 | 310 | 88 |
|  |  |  |  |  |  | 340 | 92 | 342 | 90 |
|  |  |  |  |  |  | 337 | 90 | 315 | 95 |
|  |  |  |  |  |  | 339 | 98 | 319 | 90 |
|  | ″ | ″ | ″ | ″ | 5 | 400 | 91 | 380 | 93 |
|  |  |  |  |  |  | 328 | 98 | 342 | 92 |
|  |  |  |  |  |  | 380 | 97 | 330 | 95 |
|  |  |  |  |  |  | 365 | 90 | 327 | 85 |

The manufacture of particle boards using adhesives according to the present invention is illustrated in examples 30–33.

EXAMPLE 30

The alkali lignin preparation described in example 18 was used in an adhesive formulation developed for the production of particle boards. For this purpose, the alkali lignin solution was evaporated to a solid content of 45%. The phenol-formaldehyde resin used in this adhesive was the same as in example 1.556 g of the alkali lignin solution was mixed with 363 g of the phenol-formaldehyde resin (46% solids) and 81 g of a 50% sodium hydroxide solution. The viscosity of the adhesive was 1100 cP at 25° C, measured with a Brookfield RVT-viscosimeter and the pH was 12.0. The ratio of alkali lignin to phenol-formaldehyde resin on dry basis was 60:40. Before spraying the adhesive on the chips, 100 g of paraffin emulsion with a solid content of 50%, was mixed into the adhesive. The viscosity at 25° C was after this 840 cP. The adhesive was used in the production of 3-layer particle boards, containing 30% outer layer chips and 70% inner layer chips. The adhesive amount sprayed on the chips was 12% (calculated as dry) on the surface chips and 10% on the inner layer chips. Prior to gluing the moisture content of the chips was approximately 1% and after the gluing about 11%. The thickness of the boards was 15 mm and volume weight 750 kg/m³. The boards were hot-pressed at 400° F, pressure 383 p.s.i. and time 60 s/mm. The properties of the boards, determined according to the German standards DIN 52360-65 and 68761, appear in the Table 14, each value is the average of 5 boards or 25 test pieces.

EXAMPLE 31

Using the lignosulfonate fraction of example 24 and formulation of example 30 an adhesive was prepared and used in the production of 15 mm three-layer particle boards. The viscosity of the adhesive was 920 cP at 25° C and pH 11.8. The adhesive amount and hot-pressing conditions used were the same as in example 30, except that the pressing time was now 40 s/mm. The properties of the boards appear in Table 14 as determined according to the German DIN standards. Each value is the average of 5 boards or 25 test pieces.

TABLE 14

| Ex. No. | Thickn. of the board mm | Vol. weight kg/m³ | Bending strength p.s.i. | Tensile strength p.s.i. | Thickn. 2 h % | swell 24 h % | Tensile strength after boiling (V100) p.s.i. |
|---|---|---|---|---|---|---|---|
| 30 | 15 | 750 | 2900 | 88 | 1.9 | 12.9 | 36 |
| 31 | 15 | 750 | 3200 | 92 | 2.2 | 11.5 | 45 |
| Reg. DIN |  |  | ≧2560 | ≧50 | ≦6.0 | ≦12.0 | ≧21 |

EXAMPLE 32

The lignin fraction of example 19 in a water-solution with a solid content of 45%, was used in an adhesive formulation for the production of particle boards employing both contact and high-frequency heating during the hot-pressing stage. 405 g of the alkali lignin solution (45% solids) was mixed with 474 g of the commercial phenol-formaldehyde resin of example 10 (46% solids). The viscosity of the adhesive at 25° C was 400 cP, measured with a Brookfield RVT-viscosimeter. The ratio of lignin to phenol-formaldehyde resin ratio on dry basis was 40:60. Before spraying the adhesive on the chips, 90 g of a paraffin emulsion (50% solids) was added. The viscosity at 25° C was now 350 cP. The adhesive composition was used for the production of particle boards, employing combined contact and high-frequency heating during the hot-pressing stage. The temperature of the press plates was 180°–200° C. A 4 kw high-frequency generator was used at 13.6 MHZ. 3-layer particle boards were manufactured, consisting of 70% of inner layer chips and 30% of outer layer chips. The adhesive was sprayed on the chips in amounts of 10% on the inner layer chips and 12% on the outer layer chips, calculated as dry matter/dry chips. The moisture content of the chips was before gluing 1–2% and after gluing 11–12%.

Boards with a thickness of 20 mm and 30 mm and a volume weight of 650 kg/m³ were prepared using the pressing times 10, 15 and 20 s/mm. The swelling properties after soaking in water for 2 and 24 hours, and the tensile strength after boiling (V100) were determined according to the German standards, Table 15.

TABLE 15

| Ex. No. | Pressing time s/mm | Thickn. of the board mm | Volume weight kg/m³ | Thickness 2 h % | swell 24 % | Tensile strength after boiling (V 100), p.s.i. |
| --- | --- | --- | --- | --- | --- | --- |
| 32 | 10 | 20 | 650 | 10.2 | 20.1 | 18 |
|  | 15 | " | " | 6.3 | 12.0 | 24 |
|  | 20 | " | " | 4.1 | 10.3 | 32 |
|  | 10 | 30 | 650 | 8.0 | 16.6 | 21 |
|  | 15 | " | " | 4.2 | 11.0 | 28 |
|  | 20 | " | " | 1.5 | 8.3 | 36 |
| Reg. DIN |  |  |  | ≦6.0 | ≦12.0 | ≧21 |

EXAMPLE 33

The alkali lignin fraction of example 17 was spray-dried to a powder with a moisture content of 4%. A phenol-formaldehyde resin, developed for the production of particle boards, having a solid content of 53%, a viscosity of 272 cP at 25° C and a pH of 11.5, was employed. To 1000 g of this resin solution 212 g of paraffin emulsion with a solid content of 50% was added prior to gluing. The alkali lignin powder was blended with the chips in an amount of 5% dry powder/dry chips. After this the phenol-formaldehyde-paraffin solution was sprayed on the chips in an amount of 6% solids/dry chips. The moisture content of the chips was prior to gluing 2% and after the gluing procedure 8%. 12 mm particle boards were hot-pressed at a temperature of 420° F, at a pressure of 425 p.s.i., using the pressing time 40 s/mm. The properties of the boards appear in Table 16.

TABLE 16

| Ex. No. | Thickn. of the board, mm | Volume weight kg/m³ | Bend. strength p.s.i. | Tensile strength p.s.i. | Thickn. 2 h % | swelling 24 h % | Tensile strength after boiling (V 100) p.s.i. |
| --- | --- | --- | --- | --- | --- | --- | --- |
| 33 | 12 | 700 | 2800 | 70 | 4.0 | 13.5 | 23 |
|  | " | " | 2600 | 65 | 3.8 | 14.2 | 24 |
|  | " | " | 2920 | 80 | 4.1 | 14.3 | 21 |
|  | " | " | 3100 | 76 | 3.8 | 14.0 | 25 |

The following examples 34–35 illustrate the practice of this invention in the production of fiber boards.

EXAMPLE 34

The lignosulfonate preparation of example 27, obtained from spent sulfite liquor by ultrafiltration was employed preparing an adhesive formulation for use in the production of fiber boards. A commercial phenol-formaldehyde resin was employed having a viscosity of 80 cP at 25° C, a pH of 11.8, solid content of 40% and ash content 4.5%. The adhesive was prepared by mixing 1000 g of the lignosulfonate - solution obtained from the ultrafiltration as a 25% solution, with 8375 g of water (25° C) and with 625 g of the 40% phenol-formaldehyde resin, thus forming an adhesive solution with a solid content of 5%. The lignin: phenol-formaldehyde ratio on dry basis was 50:50. The adhesive composition was employed in the production of fiber boards 3 mm thick. The adhesive was added to the fiber suspension whereupon an aluminum sulfate solution with a solid content of 2% was added to precipitate the resin solids on the fibers. The adhesive solids as well as the aluminum sulfate added amounted to 1% of the dry fibers. The fiber boards were produced using a temperature of 200° C, pressure of 680 p.s.i. and pressing time 5 minutes. The boards were additionally cured at 160° C for 4 minutes. The properties of the boards appear in Table 17.

EXAMPLE 35

An adhesive was prepared for the production of fiber boards using the alkali lignin preparation of example 17 and the commercial phenol-formaldehyde resin of example 34. 1400 g of the 25% alkali lignin solution was mixed with 375 g of the 40% phenol-formaldehyde resin and 8225 g of water, forming a 5% solution with a pH of 12.0. The lignin: phenol-formaldehyde ratio on dry basis was 70:30. The adhesive was employed for the production of fiber boards. The adhesive was added to the fiber suspension whereupon an aluminum sulfate solution with a solid content of 2% was added to precipitate the resin solids on the fibers. The adhesive solids as well as the aluminum sulfate added amounted to 1% of the dry fibers. The manufacturing conditions for the 3 mm fiber boards were the same as in example 34. The properties of the boards appear in Table 17.

TABLE 17

| Ex. No. | Thickness mm | Vol. weight kg/m³ | Bending strength p.s.i. | Tensile strength p.s.i. | Water abs. 24 h % | Thickness swelling 24 h, % |
| --- | --- | --- | --- | --- | --- | --- |
| 34 | 3,10 | 850 | 6350 | 3569 | 25.4 | 16.0 |
|  |  |  | 8200 | 3150 | 24.0 | 17.0 |
|  |  |  | 7500 | 3640 | 25.1 | 16.0 |
|  |  |  | 6800 | 3400 | 23.9 | 18.5 |
| 35 | 3,13 | 850 | 7764 | 3570 | 23.6 | 19.2 |
|  |  |  | 7540 | 3520 | 25.5 | 18.0 |
|  |  |  | 7125 | 3480 | 27.0 | 17.0 |
|  |  |  | 6800 | 3500 | 25.8 | 17.5 |

Various modes of carrying out the invention are contemplated as being within the scope of the following claims particularly pointing out and distinctly claiming the subject matter which is regarded as the invention.

We claim:

1. An adhesive for the manufacture of wood products, comprising the combination of (a) a lignin derivative selected from the group consisting of lignosulfonates and alkali salts of alkali lignins, a minimum of 65% by weight of the lignosulfonates and a minimum of 40% by weight of the alkali lignins having a relative molecular weight as determined by gel chromatography in excess of that of glucagon, and (b) a phenol formaldehyde resin.

2. An adhesive for the manufacture of wood products, comprising the combination of alkali salts of alkali lignins and a phenol-formaldehyde resin, a minimum of 45% by weight of the alkali lignins having a relative molecular weight as determined by gel chromatography in excess of that of glucagon, a water solution of said adhesive having a pH in excess of 7.0.

3. The adhesive of claim 2, wherein the pH value of the water solution of the adhesive is between 8 and 13.

4. The adhesive of claim 2, wherein the alkali salts of the alkali lignins are sodium salts.

5. The adhesive of claim 2, wherein the weight ratio of the alkali lignins to the phenol-formaldehyde resin is 90:10–20:80.

6. The adhesive of claim 2, and including an effective amount of an aldehyde as a hardener, said aldehyde selected from the group consisting of formaldehyde, paraformaldehyde and furfural.

7. The adhesive of claim 2, wherein the alkali lignins are sulfate lignins.

8. An adhesive for the manufacture of wood products, comprising the combination of alkali salts of alkali lignins and a phenol-formaldehyde resin, a minimum of 35% by weight of the alkali lignins having a molecular weight as determined by gel chromatography in excess of 5000, a water solution of said adhesive having a pH in excess of 7.0.

9. The adhesive of claim 8, wherein the pH value of the water solution of the adhesive is between 8 and 13.

10. The adhesive of claim 8, wherein the alkali salts of the alkali lignins are sodium salts.

11. An adhesive for the manufacture of wood products, comprising the combination of lignosulfonates and a phenol-formaldehyde resin, a minimum of 70% by weight of the lignosulfonates having a relative molecular weight as determined by gel chromatography in excess of that of glucagon.

12. The adhesive of claim 11, wherein the weight ratio of the lignosulfonates to the phenol-formaldehyde resin is 90:10–20:80.

13. The adhesive of claim 11, and including an effective amount of an aldehyde as a hardener, said aldehyde selected from the group consisting of formaldehyde, paraformaldehyde and furfural.

14. The adhesive of claim 11, wherein the lignosulfonates are alkali salts.

15. The adhesive of claim 11, wherein the pH value of the water solution of the adhesive is between 8 and 13.

16. An adhesive for the manufacture of wood products, comprising the combination of lignosulfonates and a phenol-formaldehyde resin, a minimum of 55% by weight of the lignosulfonates having a molecular weight as determined by gel chromatography in excess of 5000.

17. The adhesive of claim 16, wherein the lignosulfonates as a neutralized 50% water solution have a viscosity exceeding 10,000 cP at a temperature of 23° C.

18. The adhesive of claim 16, wherein the lignosulfonates are alkali salts.

19. The adhesive of claim 16, wherein the pH value of the water solution of the adhesive is between 8 and 13.

* * * * *

UNITED STATES PATENT AND TRADEMARK OFFICE
CERTIFICATE OF CORRECTION

PATENT NO. : 4,105,606

DATED : August 8, 1978

INVENTOR(S) : KAJ G. FORSS ET AL

It is certified that error appears in the above-identified patent and that said Letters Patent are hereby corrected as shown below:

Column 1, line 38, Cancel "attemps" and substitute therefor ---attempts---, Column 2, line 59, Cancel "bases" and substitute therefor ---based---, Column 4, line 20, Cancel "sodium", Column 4, line 21, Cancel "hydroxide or the sulfate process wherein the pulping", Column 4, line 22, Cancel "liquor contains", Column 5, line 1, After "1.5" insert ---.--- (a period), Column 5, line 25, After "Furthermore" cancel "may", Column 5, line 26, After "furfural" insert ---may---, Column 5, line 48, Cancel "unfractioned" and substitute therefor ---unfractionated---, Column 5, line 52, Before "corresponding" cancel "tion" and substitute therefor ---tions---, Column 6, line 10, Cancel "followig" and substitute therefor ---following---, Column 6, line 16, Cancel "with600" and substitute therefor ---with 600---, Column 7, line 16, Cancel "example" and substitute therefor ---Example--- Column 9, line 3, Cancel "weree" and substitute therefor ---were---, Column 9, line 33, Cancel "37%" and substitute therefor ---37.5%---, Column 11, Line 39, Cancel "formulation" and substitute therefor ---formulations---, Column 11, line 48, Cancel "Sames" and substitute therefor ---Samples---, Column 11, line 59, Cancel "weighting" and substitute therefor ---weighing---, Column 13, line 30, Cancel "440%" and substitute therefor ---40.0%---, Column 14, Line 12, Cancel "weight" and substitute therefor ---weights---, Column 14, line 38, Cancel "trafilitration" and substitute therefor ---trafiltration---, Column 14, line 39, Cancel "weight" and substitute therefor ---weights---, Column 16, line 45 Cancel "Ph" and substitute therefor ---pH---, Column 17, line 26, Cancel "using" and substitute therefor ---Using---

UNITED STATES PATENT AND TRADEMARK OFFICE
CERTIFICATE OF CORRECTION

PATENT NO. : 4,105,606
DATED : August 8, 1978.
INVENTOR(S) : KAJ G. FORSS ET AL

It is certified that error appears in the above–identified patent and that said Letters Patent are hereby corrected as shown below:

Column 18, line 20, Cancel "the", first occurrence, and substitute therefor ---The---, Column 18, line 31, Cancel "1/10 and $\frac{1}{8}$" and substitute therefor ---1/10" and 1/8"--- Column 19, Line 39, Cance; "example 1.556g" and substitute therefor ---example 1.  556g---.

Signed and Sealed this

Twentieth Day of February 1979

[SEAL]

Attest:

RUTH C. MASON
*Attesting Officer*

DONALD W. BANNER
*Commissioner of Patents and Trademarks*